US009094216B2

(12) United States Patent
Lin et al.

(10) Patent No.: US 9,094,216 B2
(45) Date of Patent: Jul. 28, 2015

(54) SYSTEM AND METHOD FOR ADJUSTING THE FREQUENCY OF UPDATING CERTIFICATE REVOCATION LIST

(71) Applicant: INDUSTRIAL TECHNOLOGY RESEARCH INSTITUTE, Hsinchu (TW)

(72) Inventors: Chih-Che Lin, New Taipei (TW); Pei-Chuan Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 151 days.

(21) Appl. No.: 13/654,344

(22) Filed: Oct. 17, 2012

(65) Prior Publication Data

US 2013/0145157 A1 Jun. 6, 2013

(30) Foreign Application Priority Data

Dec. 5, 2011 (TW) .............................. 100144593 A

(51) Int. Cl.
| | |
|---|---|
| *H04L 29/06* | (2006.01) |
| *H04L 9/32* | (2006.01) |
| *G06F 7/04* | (2006.01) |
| *G06F 17/30* | (2006.01) |

(52) U.S. Cl.
CPC .............. *H04L 9/3268* (2013.01); *H04L 63/20* (2013.01); *H04L 2209/16* (2013.01)

(58) Field of Classification Search
None
See application file for complete search history.

(56) References Cited

U.S. PATENT DOCUMENTS

| | | | |
|---|---|---|---|
| 5,687,235 A * | 11/1997 | Perlman et al. ................ | 713/158 |
| 5,699,431 A | 12/1997 | Van Oorschot et al. | |
| 6,128,740 A | 10/2000 | Curry et al. | |
| 6,775,782 B1 * | 8/2004 | Buros et al. ....................... | 726/2 |
| 6,950,933 B1 | 9/2005 | Cook et al. | |
| 7,437,551 B2 | 10/2008 | Chan et al. | |
| 7,761,467 B2 | 7/2010 | Xu et al. | |
| 7,814,315 B2 | 10/2010 | Parkinson | |
| 7,827,401 B2 | 11/2010 | Micali | |
| 7,853,785 B1 | 12/2010 | Thurman et al. | |

(Continued)

FOREIGN PATENT DOCUMENTS

| | | |
|---|---|---|
| CN | 101443745 | 5/2009 |
| CN | 102223362 | 10/2011 |

(Continued)

OTHER PUBLICATIONS

Taiwan Patent Office, Office Action, Patent Application Serial No. 100144593, Dec. 27, 2013, Taiwan.
Albert Wasef et al., "DCS: An Efficient Distributed-Certificate-Service Scheme for Vehicular Networks," IEEE Transactions on Vehicular Technology, Feb. 2010, pp. 533-549, vol. 59, No. 2, IEEE, US.
Peifang Zheng, "Tradeoffs in Certificate Revocation Schemes," ACM SIGCOMM Computer Communications Review, Apr. 2003, pp. 103-112, vol. 33, No. 2, ACM, US.

(Continued)

*Primary Examiner* — Shin-Hon Chen

(57) ABSTRACT

A method for adjusting the frequency of updating certificate revocation list is provided. The method is used in a certificate authority. The method includes: receiving a first information indicating security levels from neighbor certificate authorities in a neighborhood or a central certificate authority; detecting whether the certificate authority has received a signal indicating that a user is using a revoked certificate and generating a second information of a security level; calculating an index value or a set of index values by the first information indicating the security levels of neighborhoods and the second information indicating its own security level; and adjusting the update frequency of updating the certificate revocation list according to the calculated index values or the set of index values.

10 Claims, 4 Drawing Sheets

(56) References Cited

U.S. PATENT DOCUMENTS

| | | | |
|---|---|---|---|
| 2002/0099822 A1* | 7/2002 | Rubin et al. | 709/225 |
| 2003/0236976 A1 | 12/2003 | Wheeler | |
| 2004/0111609 A1* | 6/2004 | Kaji et al. | 713/156 |
| 2005/0021969 A1* | 1/2005 | Williams et al. | 713/176 |
| 2005/0154879 A1* | 7/2005 | Engberg et al. | 713/157 |
| 2009/0198618 A1* | 8/2009 | Chan et al. | 705/66 |
| 2009/0249062 A1 | 10/2009 | Thomas et al. | |
| 2010/0146250 A1* | 6/2010 | Bergerson et al. | 713/1 |
| 2011/0083011 A1 | 4/2011 | DiCrescenzo | |

FOREIGN PATENT DOCUMENTS

| | | |
|---|---|---|
| TW | 200605592 | 2/2006 |
| TW | I300303 | 8/2008 |

OTHER PUBLICATIONS

Kenneth P. Laberteaux et al., "Security Certificate Revocation List Distribution for VANET," VANET '08 Proceedings of the fifth ACM International Workshop, Sep. 2008, pp. 88-89, ACM, US.

Albert Wasef et al., "ECMV: Efficient Certificate Management Scheme for Vehicular Networks," Global Telecommunication Conference, 2008 IEEE "GLOBECOME" 2008, Dec. 2008, pp. 1-5, IEEE, US.

Panagiotis (Panos) Papadimitratos et al., "Certificate Revocation List Distribution in Vehicular Communication Systems," VANET '08 Proceedings of teh fifth ACM Interational Worshop on Vehicular Inter-NETworking, Sep. 2008, pp. 86-87, ACM, US.

China Patent Office, Office Action, Patent Application U.S. Appl. No. 201210013699.6, May 6, 2015, China.

* cited by examiner

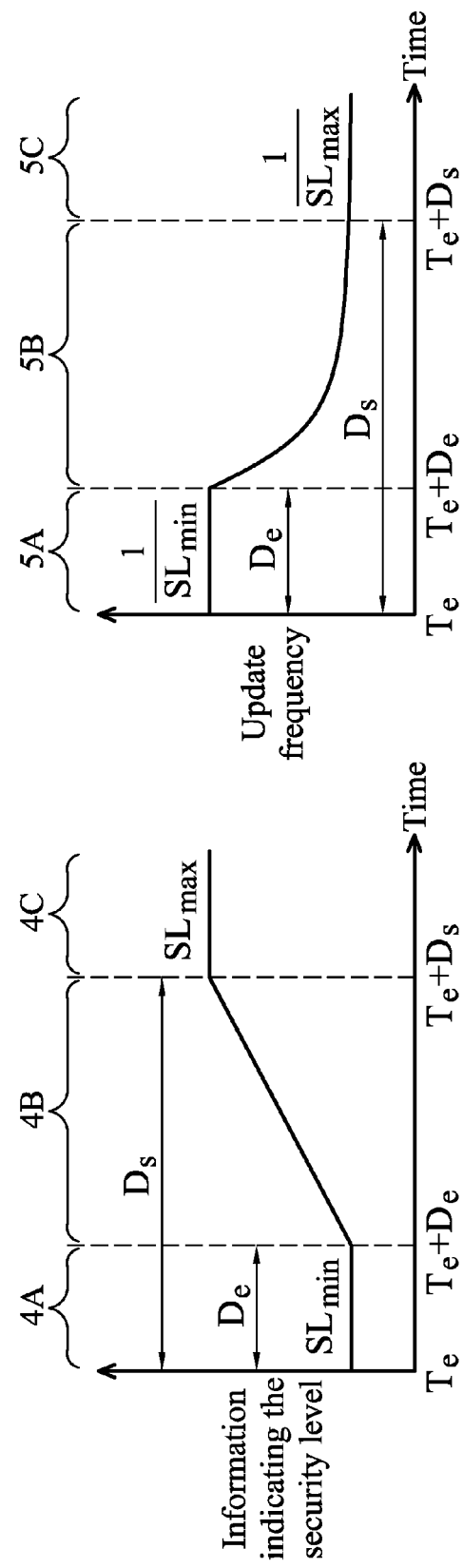

SYSTEM AND METHOD FOR ADJUSTING THE FREQUENCY OF UPDATING CERTIFICATE REVOCATION LIST

CROSS REFERENCE TO RELATED APPLICATIONS

The present application is based on, and claims priority from, Taiwan (International) Patent Application No. 100144593, filed on Dec. 5, 2011, the disclosure of which is hereby incorporated by reference herein in its entirety.

TECHNICAL FIELD

The present disclosure relates to a method and system for adjusting the frequency of updating certificate revocation list.

BACKGROUND

The security of certificate is the basis of secure network communications between vehicles or apparatuses. In the new types of wireless networks, it is common to exchange messages directly between vehicles or apparatuses due to application purpose or efficiency. For example, within the vehicular safety communication applications promoted by European and American governments in recent years, vehicles are requested to exchange the positions, speeds, and statuses to each other directly every 100 milliseconds (ms). In such a short time, the vehicle communication unit cannot query and wait the response from a Certificate Authority (CA) before verifying exchanged message. Therefore, the vehicle communication unit cannot know whether the corresponding certificate of each message is legal. Currently, most of the existing certificate management architectures rely on the certificate revocation list broadcast by the certificate authority periodically.

When a user does not update the certificate revocation list regularly or the user cannot obtain the latest certificate revocation list immediately, the user may authenticate the message signed by a revoked certificate mistakenly, and then exchanges the messages or trades with it. The situation that the user does not update the certificate revocation list regularly may lead to the consequences for such as chaotic traffic conditions, transaction fraud, leakage of personal information and low reliability of systems for the public.

Thus there is a need to develop a method and system used in a CA for adjusting the frequency of updating a certificate revocation list.

SUMMARY

A detailed description is given in the following exemplary embodiments with reference to the accompanying drawings.

Methods and systems used in certificate authorities for adjusting the frequency of updating a certificate revocation list are provided.

In one exemplary embodiment, the disclosure is directed to a method for adjusting a frequency of updating a certificate revocation list. The method is used in a certificate authority, comprising: receiving a first information indicating security levels of neighborhoods from neighbor certificate authorities or a central certificate authority; detecting whether the certificate authority has received a signal indicating that a user is using a revoked certificate; generating a second information indicating a security level; calculating an index value or a set of index values according to the first information indicating the security levels of neighborhoods and the second information indicating its own security level; and adjusting the frequency of updating the certificate revocation list according to the index value or the set of index values.

In one exemplary embodiment, the disclosure is directed to a certificate authority for adjusting a frequency of updating a certificate revocation list. The certificate authority comprises a computing unit for generating a second information indicating a security level and a calculator for calculating the update frequency of a certificate revocation list. The computing unit for generating the second information indicating a security level is configured to detect whether a certificate authority has received a signal indicating that a user is using a revoked certificate and calculate the second information indicating the security level. The calculator for calculating the update frequency of a certificate revocation list is configured to receive a first information indicating the security levels of neighbor certificate authorities or a central certificate authority and the second information indicating its own security level, calculate an index value or a set of index values according to the first information indicating the security levels of neighborhoods and the second information indicating its own security level, and calculate a frequency of updating the certificate revocation list according to the index value or the set of index values.

BRIEF DESCRIPTION OF THE DRAWINGS

The present disclosure can be more fully understood by reading the subsequent detailed description and examples with references made to the accompanying drawings, wherein:

FIG. 4 is a variation diagram illustrating the variation of the security level and the time that a user uses a revoked certificate illegally in the area of the certificate authority according to an exemplary embodiment of the present disclosure.

FIG. 5 is a variation diagram illustrating the variation of the update frequency of updating the certificate revocation list and the time that a user uses a revoked certificate illegally in the area of the certificate authority according to an exemplary embodiment of the present disclosure.

DETAILED DESCRIPTION

The following description is of the contemplated mode of carrying out the disclosure. This description is made for the purpose of illustrating the general principles of the disclosure and should not be taken in a limiting sense. The scope of the disclosure is determined by reference to the appended claims.

Figure 1:
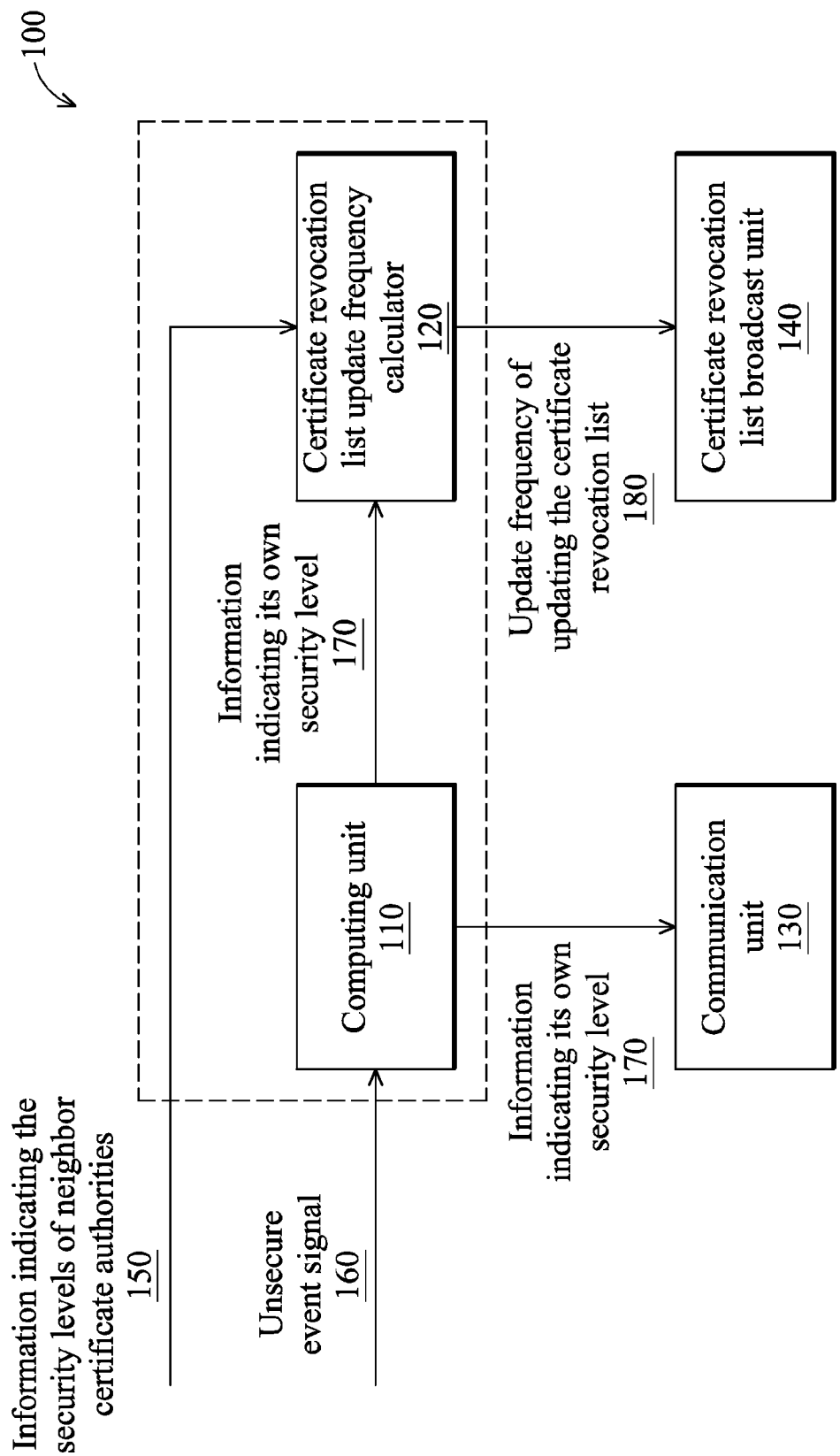
FIG. 1 is a block diagram of a certificate authority according to an exemplary embodiment of the present disclosure.

FIG. 1 is a block diagram of a certificate authority 100 according to an exemplary embodiment of the present disclosure. The certificate authority 100 comprises a computing unit 110 for generating the information indicating a security level, a certificate revocation list update frequency calculator 120, a communication unit 130 for broadcasting/transmitting/receiving the information indicating its own security level and a certificate revocation list broadcast unit 140. The computing unit 110 for generating the information indicating the security level is configured to detect whether the certificate authority 100 receives an unsecure event signal 160 indicating that a user is using a revoked certificate. Then, the computing unit 110 for generating the information indicating the security level calculates the information indicating its own security level 170, and transmits/receives the information indicating its own security level 170 to/from the certificate revocation list update frequency calculator 120 and the communication unit 130 for broadcasting/transmitting/receiving the information indicating its own security level. After receiving the information indicating its own security level 170, the communication unit 130 for broadcasting/transmitting/receiving the information indicating its own security level broadcasts the information indicating its own security level 170 to the neighbor certificate authorities in the neighborhood. The certificate revocation list update frequency calculator 120 is configured to receive the information indicating security levels of neighbor certificate authorities or a central certificate authority in the neighborhood 150 and the information indicating its own security level 170 calculated by the computing unit 110 for generating the information indicating the security level. The certificate revocation list update frequency calculator 120 calculates an index value or a set of index values according to the information indicating the security levels of neighborhoods 150 and the information indicating its own security level 170. Then, the certificate revocation list update frequency calculator 120 calculates a certificate revocation list update frequency 180 according to the index value or the set of index values and transmits the certificate revocation list update frequency 180 to the certificate revocation list broadcast unit 140. After receiving the frequency of updating the certificate revocation list 180, the certificate revocation list broadcast unit 140 broadcasts the frequency of updating the certificate revocation list 180 or the timestamp of updating next certificate revocation list or the time amount of the counting down process for triggering next certificate revocation list broadcast. In another exemplary embodiment, the certificate authority can be installed in a vehicle or a road-side unit (RSU).

First of all, taking the above factors of the information indicating the security level and the information indicating the security levels of neighborhoods into consideration, this disclosure uses the parameters defined below:

the information indicating a security level (SL) represents the information indicating the security level of a certificate authority. Moreover, two parameters further defined in this disclosure. $SL_{min}$ and $SL_{max}$ are the minimum value and the maximum value of the information indicating the security level of the certificate authority, respectively. The ranges of $SL_{min}$ and $SL_{max}$ defined can be different according to different applications or requirements. For example, when the system enters an emergency mode, the update frequency of updating the certificate revocation list is at least once every minute. When the system is in a safety mode, the update frequency of updating the certificate revocation list is at least once every 60 minutes. As stated above, the parameter $SL_{min}$ can be defined as 1 (minute per time), and the parameter $SL_{max}$ can be defined as 60 (minutes per time).

An index value or a set of index values (ESL) is defined as an index value or a set of index values calculated by a certificate authority after considering the information indicating the security levels from the certificate authorities in the neighborhood.

Update Frequency ($F_u$) is defined as a frequency of updating the certificate revocation list.

Emergency Duration Threshold ($D_e$) is defined as a duration of an emergency mode the system enters when a user uses a revoked certificate illegally in an area of a certificate authority.

Safety Duration Threshold ($D_s$) is defined as a duration that the system returns to the safety mode after a user illegally uses a revoked certificate in an area of a certificate authority.

Current Timestamp ($T_c$) is defined as a current time.

Unsecure Event Timestamp ($T_e$) is defined as a timestamp that a user starts to use a revoked certificate illegally in an area of a certificate authority.

Neighborhood (V) is defined as an area of the neighborhood of a certificate authority.

Figure 2:
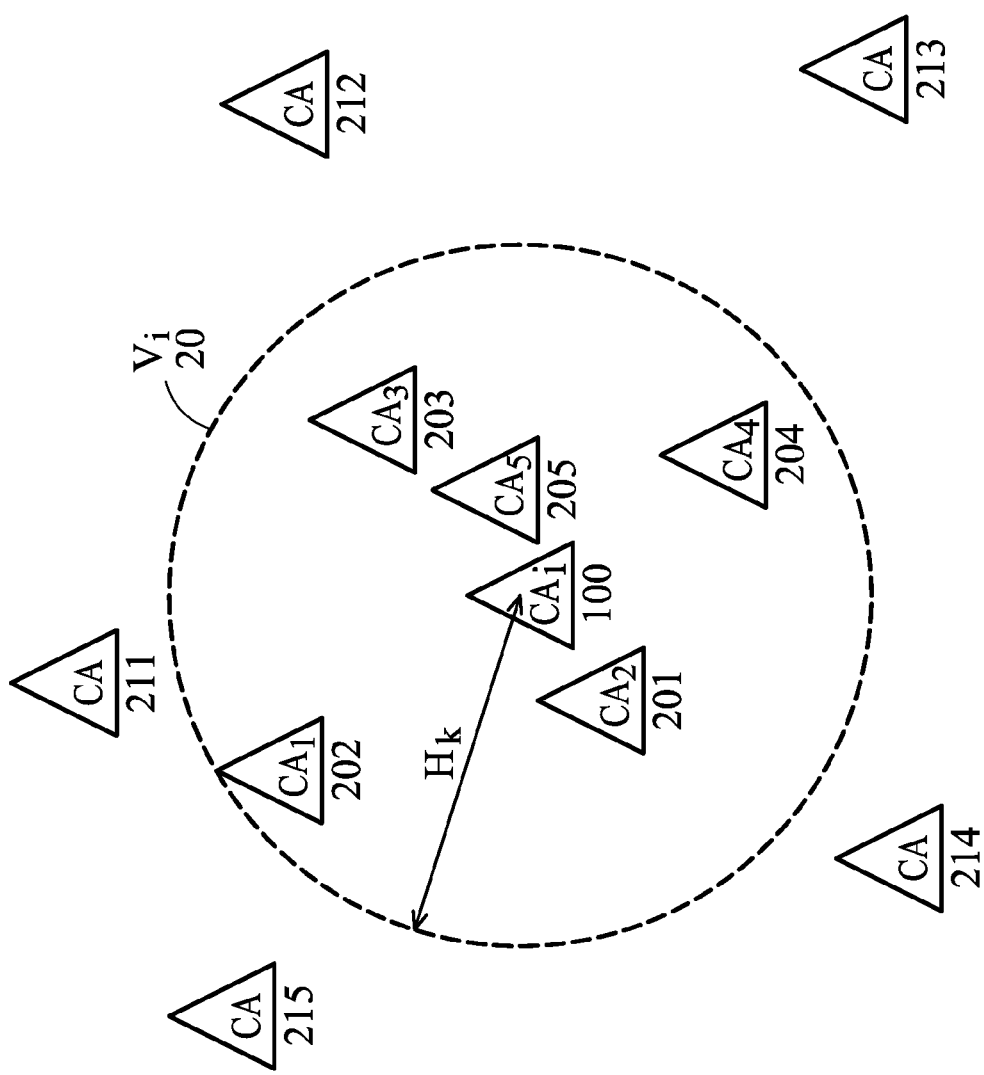
FIG. 2 is a schematic diagram of certificate authorities in an area according to an exemplary embodiment of the present disclosure.

Referring to both FIGS. 1~2, FIG. 2 is a schematic diagram of certificate authorities in an area according to an exemplary embodiment of the present disclosure. As shown in FIG. 2, there is a plurality of certificate authorities (CA) distributed in the area. There are a certificate authority 100 ($CA_i$) described in FIG. 1, neighbor certificate authorities 201~205 ($CA_1$~$CA_5$) and certificate authorities 211~215 (CA) outside the neighborhood. The neighborhood ($V_i$) of the certificate authority 100 ($CA_i$) can be defined as:

$$V_i = \{CA_j | \forall CA_j \text{ such that } H_{ij} \leq H_k\},$$

wherein $H_{ij}$ is the distance between the certificate authority 100 ($CA_i$) and the certificate authorities ($CA_j$) in the neighborhood. $H_k$ is a system parameter that is related to the distribution density of the neighbor certificate authorities. According to the function described above, the certificate authorities ($CA_j$) include the certificate authority 100 ($CA_i$) and the neighbor certificate authorities 201~205 ($CA_1$~$CA_5$) in FIG. 2.

Figure 3:
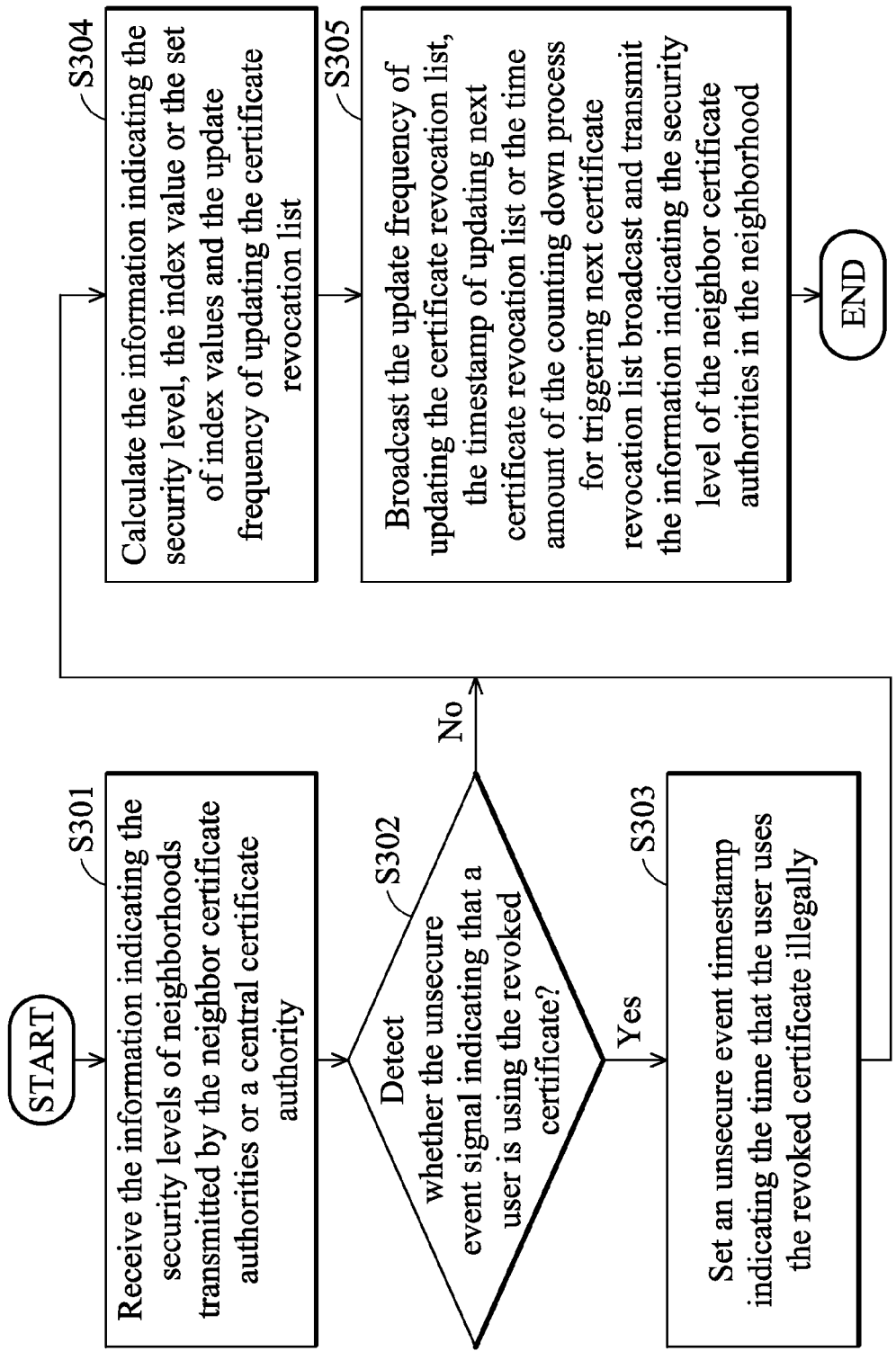
FIG. 3 is an operation flowchart illustrating a certificate authority according to an exemplary embodiment of the present disclosure.

Referring to all FIGS. 1~3, FIG. 3 is an operation flowchart illustrating an exemplary embodiment of a certificate authority ($CA_i$) of the present disclosure. First, in step S301, the certificate revocation list update frequency calculator 120 receives the information indicating the neighbor security levels ($SL_j$) of neighborhoods 150 transmitted by the neighbor certificate authorities ($CA_j$) or a central certificate authority. Then, in step S302, the computing unit 110 for generating the information indicating the security level detects whether the unsecure event signal 160 indicating that a user is using the revoked certificate has been transmitted to the computing unit 110 for generating the information indicating the security level. When the computing unit 110 for generating the information indicating the security level detects the unsecure event signal 160 ("Yes" in step S302), in step S303, the computing unit 110 for generating the information indicating the security level sets an unsecure event timestamp $T_e$ indicating the time that the user uses the revoked certificate illegally in the area of the certificate authority. In step S304, the computing unit 110 for generating the information indicating the security level calculates the information indicating its own security level ($SL_i$) 170 of the certificate authorities ($CA_i$) at current time ($T_c$) according the function as follows:

$$SL_i(T_c) = \begin{cases} SL_{min}, & \text{if } (T_c - T_e) \leq D_e \\ SL_{min} + \dfrac{SL_{max} - SL_{min}}{D_s - D_e}(T_c - (T_e + D_e)], & \text{if } D_e < (T_c - T_e) \leq D_s \\ SL_{max}, & \text{if } (T_c - T_e) > D_s. \end{cases}$$

When the computing unit 110 for generating the information indicating the security level does not detect the unsecure event signal 160 ("No" in step S302), in step S304, the computing unit 110 for generating the information indicating the security level is in a safety mode and calculates the information indicating its own security level ($SL_i$) 170 according to the current state. After calculating the information indicating its own security level ($SL_i$) 170, the computing unit 110 for generating the information indicating the security level transmits the information indicating the security level ($SL_i$) 170 to the certificate revocation list update frequency calculator 120 and the communication unit 130 for broadcasting/transmitting/receiving the information indicating its own security level. When receiving the information indicating its own security level ($SL_i$) 170 transmitted by the computing unit 110 for generating an information indicating a security level, the certificate revocation list update frequency calculator 120 calculates an index value or a set of index values ($ESL_i$) of the certificate authority ($CA_i$) according to the function as following:

$$ESL_i(T_c) = \min(SL_j(T_c)), \text{ where } CA_j \in V_i,$$

wherein the meaning of the index value or the set of index values ($ESL_i$) is that the certificate revocation list update frequency calculator 120 has found a certificate authorities ($CA_j$) with the information indicating the smallest security level ($SL_j$) currently from all of the neighbor certificate authorities ($CA_j$) in the neighborhood ($V_i$) of the certificate authority ($CA_i$), and the information indicating the smallest security level ($SL_j$) is set to the index value or the set of index values ($ESL_i$) of the certificate authority ($CA_i$). In another exemplary embodiment, when the information indicating its own security level ($SL_i$) of the certificate authority ($CA_i$) is smaller than all the information indicating the security levels ($SL_j$) of the neighbor certificate authorities ($CA_j$), the information indicating its own security level ($SL_i$) is set as the index value or the set of index values ($ESL_i$) of the certificate authority ($CA_i$). Then, the certificate revocation list update frequency calculator 120 adjusts the update frequency ($F_u$) according to the index value or the set of index values ($ESL_i$) of the certificate authority ($CA_i$). The update frequency ($F_u$) of updating the certificate revocation list is defined as follows:

$$F_{ui}(T_c) = \frac{1}{ESL_i(T_c)}.$$

The certificate revocation list update frequency calculator 120 transmits the update frequency ($F_u$) of updating the certificate revocation list to the certificate revocation list broadcast unit 140. Finally, in step S305, the certificate revocation list broadcast unit 140 broadcasts the update frequency ($F_u$) of updating the certificate revocation list, the timestamp of updating next certificate revocation list or the time amount of the counting down process for triggering next certificate revocation list broadcast. The communication unit 130 for broadcasting/transmitting/receiving the information indicating its own security level transmits/receives the information indicating its own security level ($SL_i$) of the certificate authority ($CA_i$) to/from the neighbor certificate authorities ($CA_j$) in the neighborhood ($V_i$).

FIG. 4 is a variation diagram illustrating the variation of the information indicating the security level and the time when a user uses a revoked certificate illegally in the area of the certificate authority according to an exemplary embodiment. As shown in FIG. 4, the variation diagram illustrating the variation of the information indicating the security level and the time is divided into 3 regions. In the region 4A, when the certificate authority has received a signal that indicates that a user is using a revoked certificate illegally, the computing unit for generating the information indicating the security level sets the unsecure event timestamp ($T_e$), and the information indicating the security level of the certificate authority is the minimum value of the information indicating the security level ($SL_{min}$) during the emergency duration threshold ($D_e$). After the emergency duration threshold ($D_e$), the certificate authority reverts back to the safety mode gradually in the region 4B. In the region 4C, the information indicating the security level of the certificate authority is the maximum value of the information indicating the security level ($SL_{max}$). In FIG. 4, the safety duration threshold ($D_s$) is the time period from the timestamp indicating that a user is using a revoked certificate illegally to the timestamp that the certificate authority reverts back to the secure state.

Referring to both FIGS. 4~5, FIG. 5 is a variation diagram illustrating the variation of the update frequency ($F_u$) of updating the certificate revocation list and the time that a user uses a revoked certificate illegally in the area of the certificate authority according to an exemplary embodiment. As shown in FIG. 5, when the certificate authority has received a signal that indicates a user is using a revoked certificate illegally, the certificate authority has the minimum value of the information indicating the security level ($SL_{min}$) in the region 5A. Then, the update frequency of updating the certificate revocation list is calculated according to the function described above. The update frequency of updating the certificate revocation list is $$F_{u\,max} = \frac{1}{SL_{min}}.$$

According to the above function, when the certificate authority has the minimum value of the information indicating the security level ($SL_{min}$), the update frequency of updating the certificate revocation list is the maximum of the update frequency ($F_{u\,max}$), and the certificate authority broadcasts the update frequency ($F_{u\,max}$). In the region 5B, the update frequency of updating the certificate revocation list varies with the information indicating the security level. After the safety duration threshold ($D_s$), in the region 5C, the information indicating the security level of the certificate authority has the maximum value of the information indicating the security level ($SL_{max}$), and the update frequency of updating the certificate revocation list reverts back to the minimum of the update frequency ($F_{u\,min}$):

$$F_{u\,min} = \frac{1}{SL_{max}}.$$

In another exemplary embodiment, the factor of distance may be considered to adjust and calculate the index value or the set of index values; that is to say, the impact of the information indicating the security levels of neighbor certificate authorities ($CA_j$) on the index value or the set of index values varies with the different distances between the certificate authorities ($CA_j$) and the certificate authority ($CA_i$). The certificate revocation list update frequency calculator of the certificate authority ($CA_i$) calculates the index value or the set of index values ($ESL_i$) according to the squared distance $d_{ij}^2$ and the radius I of the warning area. The index value or the set of index values ($ESL_i$) is defined as follows:

$$ESL_i(T_c) = \min\left\{SL_j(T_c) \times \max\left(\frac{d_{ij}^2}{I}, 1\right), SL_{max}\right\},$$

for $$CA_j \in V_i,$$

wherein the meaning of the index value or the set of index values ($ESL_i$) is that when the squared distance $d_{ij}^2$ between the certificate authority ($CA_j$) in the neighborhood ($V_i$) and the certificate authority ($CA_i$) is not greater than the radius I of the warning area, the index value or the set of index values ($ESL_i$) is directly influenced by the information indicating the security level ($SL_j$) of the certificate authority ($CA_j$) in the neighborhood ($V_i$). When the squared distance $d_{ij}^2$ between the certificate authorities ($CA_j$) in the neighborhood ($V_i$) and the certificate authority ($CA_i$) is greater than the radius I of the warning area, the influence of the information indicating the security level ($SL_j$) of the certificate authority ($CA_j$) on the index value or the set of index values ($ESL_i$) is reduced.

Therefore, the system and method for adjusting update frequency of updating the certificate revocation list may provide the suggested values of the update frequency of updating the certificate revocation list and the adjustment mechanism, so that the security of the system using the manner of broadcasting wirelessly is enhanced and the use of the bandwidth can be even more efficient.

While the disclosure has been described by way of example and in terms of the exemplary embodiments, it is to be understood that the disclosure is not limited to the disclosed exemplary embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for adjusting a frequency of updating a certificate revocation list, wherein the method is used in a certificate authority server, comprising:
   receiving a first information indicating security levels of neighborhoods from neighbor certificate authorities or a central certificate authority;
   detecting whether the certificate authority has received a signal indicating that a user is using a revoked certificate and generating a second information indicating a security level;
   calculating an index value or a set of index values according to the first information indicating the security levels of neighborhoods and the second information indicating its own security level;
   adjusting the frequency of updating the certificate revocation list according to the index value or the set of index values;
   broadcasting the frequency of updating the certificate revocation list, or a timestamp of updating a next certificate revocation list, or a time amount of a counting down process for triggering a next certificate revocation list broadcast; and
   transmitting the second information indicating the security level to the neighbor certificate authorities in the neighborhood.

2. The method for adjusting a frequency of updating a certificate revocation list as claimed in claim 1, wherein the second information indicating the security level is calculated according to the subsequent steps as follows:
   when a differential value between a current time and a time that the revoked certificate is used is smaller than or equal to an emergency duration threshold, the second information indicating the security level is a minimum value;
   when the differential value between the current time and the time that the revoked certificate is used is greater than a safety duration threshold, the second information indicating the security level has a maximum value; or
   when the differential value between the current time and the time that the revoked certificate is used is greater than the emergency duration threshold and smaller than or equal to the safety duration threshold, the second information indicating the security level varies with the differential value between the current time and the time that the revoked certificate is used.

3. The method for adjusting a frequency of updating a certificate revocation list as claimed in claim 1, wherein the index value or the set of index values and the frequency of updating the certificate revocation list are calculated according to the subsequent steps as follows:
   finding a first certificate authority which has a smallest second information indicating the security level from the neighbor certificate authorities in the neighborhood;
   calculating a first index value or a first set of index values according to the second information indicating the security level of the first certificate authority; and
   calculating the frequency of updating the certificate revocation list according to the first index value or the first set of index values.

4. The method for adjusting a frequency of updating a certificate revocation list as claimed in claim 1, wherein the index value or the set of index values and the frequency of updating the certificate revocation list are calculated according to the subsequent steps as follows:
   finding a second certificate authority which has the smallest second information indicating the security level according to distances between the neighbor certificate authorities in the neighborhood, a radius of a warning area and the first information indicating the security levels;
   calculating a second index value or a second set of index values according to the second information indicating the security level of the second certificate authority; and
   calculating the frequency of updating the certificate revocation list according to the second index value or the second set of index values.

5. The method for adjusting a frequency of updating a certificate revocation list as claimed in claim 1, wherein a range of the neighborhood is related to a distribution density of the neighbor certificate authorities.

6. A certificate authority server for adjusting a frequency of updating a certificate revocation list, comprising:
   a computing unit for generating a second information indicating a security level, configured to detect whether a certificate authority has received a signal indicating that a user is using a revoked certificate and calculate the second information indicating the security level;
   a calculator for calculating certificate revocation list update frequency, configured to receive a first information indicating security levels of neighbor certificate authorities or a central certificate authority and the second information indicating its own security level, calculate an index value or a set of index values according to the first information indicating the security levels of neighborhoods and the second information indicating its own security level, and calculate the frequency of updating the certificate revocation list according to the index value or the set of index values;

a certificate revocation list broadcast unit, configured to broadcast the frequency of updating the certificate revocation list, or a timestamp of updating a next certificate revocation list, or a time amount of a counting down process for triggering a next certificate revocation list broadcast; and a communication unit for broadcasting/transmitting/receiving the second information indicating the security level, configured to transmit/receive the second information indicating the security level to/from the neighbor certificate authorities in the neighborhood.

7. The certificate authority server for adjusting a frequency of updating a certificate revocation list as claimed in claim 6, Wherein the computing unit for generating the second information indicating the security level calculates the second information indicating the security level to the subsequent steps as follows:

when a differential value between a current time and a time that the revoked certificate is used is smaller than or equal to an emergency duration threshold, the second information indicating the security level has a minimum value;

when the differential value between the current time and the time that the revoked certificate is used is greater than a safety duration threshold, the second information indicating the security level has a maximum value; or when the differential value between the current time and the time that the revoked certificate is used is greater than the emergency duration threshold and smaller than or equal to the safety duration threshold, the second information indicating the security level varies with the differential value between the current time and the time that the revoked certificate is used.

8. The certificate authority server for adjusting a frequency of updating a certificate revocation list as claimed in claim 6, wherein the calculator for calculating the certificate revocation list update frequency calculates the index value or the set of index values and the frequency of updating the certificate revocation list according to the subsequent steps as follows:

finding a first certificate authority which has a smallest second information indicating the security level from the neighbor certificate authorities in the neighborhood;

calculating a first index value or the set of index values according to the second information indicating the security level of the first certificate authority; and calculating a update frequency of updating the certificate revocation list according to the first index value or a first set of index values.

9. The certificate authority server for adjusting a frequency of updating a certificate revocation list as claimed in claim 6, wherein the calculator calculates the index value or the set of index values and the update frequency of updating the certificate revocation list according to the subsequent steps as follows:

finding a second certificate authority which has the smallest second information indicating the security level according to distances between the neighbor certificate authorities in the neighborhood, a radius of a warning area and the second information indicating the security level;

calculating a second index value or a second set of the index values according to the second information indicating the security level of the second certificate authority; and calculating the frequency of updating the certificate revocation list according to the second index value or the second set of the index values.

10. The certificate authority server for adjusting a frequency of updating a certificate revocation list as claimed in claim 6, wherein a range of the neighborhood is related to a distribution density of the neighbor certificate authorities.

* * * * *